United States Patent [19]

Lunsford et al.

[11] Patent Number: 5,036,481
[45] Date of Patent: Jul. 30, 1991

[54] PERSONAL COMPUTER SYSTEM WITH DUAL PURPOSE EXPANSION SLOT

[75] Inventors: David R. Lunsford, Austin; Joe E. Llamas, Round Rock, both of Tex.

[73] Assignee: Dell USA Corporation, Austin, Tex.

[21] Appl. No.: 643,705

[22] Filed: Jan. 22, 1991

Related U.S. Application Data

[63] Continuation of Ser. No. 340,102, Apr. 18, 1989, abandoned.

[51] Int. Cl.⁵ ............................................. G06F 1/00
[52] U.S. Cl. ..................................................... 364/708
[58] Field of Search ................ 364/708; 361/380, 397, 361/400

[56] References Cited

U.S. PATENT DOCUMENTS

| | | | |
|---|---|---|---|
| 4,479,198 | 10/1984 | Romano et al. | 364/708 X |
| 4,530,066 | 7/1985 | Ohuraki et al. | 364/708 |
| 4,639,863 | 1/1987 | Harrison et al. | 364/708 X |
| 4,742,477 | 5/1988 | Phillips et al. | 364/708 |
| 4,862,400 | 8/1989 | Selbrede | 364/708 |

Primary Examiner—Gary V. Harkcom
Assistant Examiner—Tan V. Mai
Attorney, Agent, or Firm—Thomas G. Devine

[57] ABSTRACT

A personal computer system has an I/O channel and a memory channel with a main logic board incorporating both the I/O channel and the memory channel. The computer has eight (8) expansion slots including a dual-purpose expansion slot for providing space for selective connections of I/O devices through the use of full-length logic cards or half-length logic cards being inserted into edge connectors, High speed memory, including memory control, is mounted on the main logic board and expansion memory, controlled by the memory control is mounted on a printed circuit card that is connected to the memory channel in position within the dual-purpose expansion slot, occupying approximately one-half of that slot, thereby enabling the dual-purpose expansion slot to encompass both the expansion memory and a half-length logic card. In another embodiment, the half-length logic card and the memory card within the dual-purpose expansion slot are integrated into a single logic/memory card.

17 Claims, 5 Drawing Sheets

PERSONAL COMPUTER SYSTEM WITH DUAL PURPOSE EXPANSION SLOT

This application is a continuation of application Ser. No. 07/340,102, filed Apr. 18, 1989, now abandoned.

BACKGROUND OF THE INVENTION

1. Field of the Invention

This invention relates to personal computer systems having high-speed memory. More particularly, it relates to such systems having the facility for expanding the high-speed memory with minimum impact on the capacity for input/output connections.

2. Description of the Prior Art

When Industry Standard Architecture (ISA) personal computers were introduced, high-speed memory capacity of 64 K bytes up to 256 K bytes was located on the main circuit board. These computers also contained an input/output (I/O) expansion capability which generally provided eight (8) slots for connection with the I/O channel which was incorporated in the main logic board. The memory was then expanded, as desired, through the use of plug-in adapter cards, plugged into the I/O channel. Memory on the I/O channel and memory on the memory channel had equivalent performance.

As higher speed processors and wider data paths (i.e., 32-bit versus 16-bit), as well as requirements for more and more high-speed memory led to architectures that could run the memory channel much faster than the I/O channel. Because of the performance impact (overall performance is tightly coupled to memory performance), it was desirable to allow maximum memory expansion on the dedicated memory channel. However, because of the form factor of existing personal computer chassis, the problem of providing large memory capacities on the dedicated memory channel was difficult.

A prior art scheme for providing a large amount of high-speed memory was to use a dedicated full-length memory card connected to the memory channel. A disadvantage with this solution is that the memory card extended over one of the eight available I/O expansion slots, making that slot useless.

Another prior art approach has been to provide Single In-line Memory Modules (SIMMs) in the allocated space for high-speed memory on the main logic board. This technique permitted a total memory capacity of 8 Megabytes. Any expansion of memory above 8 Megabytes had to be performed on the I/O channel which resulted in slow memory for the upper addresses as well as resulting in at least one full-length expansion slot being occupied.

BRIEF SUMMARY OF THE INVENTION

This invention is the expansion of high-speed memory to the state-of-the-art maximum capacity (16 Megabytes) with minimum impact on the I/O capacity. The computer has a chassis of a given size on which is mounted a main logic board and which incorporates an I/O channel and a memory channel. To enable the addition of various I/O devices to the system, eight (8) expansion slots are provided which include an edge-type connector for each of the slots. Either a full-length or a short-length logic card may be inserted into any of the expansion slot connectors. These logic cards are tailored for their particular function as controllers and the like. The dual-purpose expansion slot of this invention, however, does not permit the use of a full-length logic card, if the high-speed memory is also to be expanded.

The high-speed memory is made up of a plurality of Single In-line Memory Modules (SIMMs) which are inserted in place on the main logic board using SIMMs sockets. Using just this arrangement, the memory capacity can be as much as 8 Megabytes. To double this capacity to as much as 16 Megabytes, a memory expansion board is set into a special connector mounted on the main logic board and located within the area specifically designated for high-speed memory. The memory expansion board has eight (8) SIMMs sockets arranged thereon, controlled by a memory controller on the main logic board. Each SIMM may be of 256 Kilobytes or 1 Megabyte, therefore enabling an additional 2 Megabyte to 8 Megabyte capacity.

The memory expansion board is of such a size that it, together with a short logic card inserted into the edge connector of the dual-purpose expansion slot, fit easily within that slot. Therefore, an additional 8 Megabytes of memory is accomplished without eliminating an I/O expansion slot.

Another embodiment of this invention is one wherein the SIMMs and the logic card mounted on one board are connected to the memory channel at one end and to the I/O channel at the other.

The primary object of this invention is to provide a personal computer system having a fixed number of expansion slots with additional high speed memory not significantly reducing the I/O capability of the computer.

This and other objects will be made evident in the detailed description that follows.

DETAILED DESCRIPTION OF THE INVENTION

Figure 1:
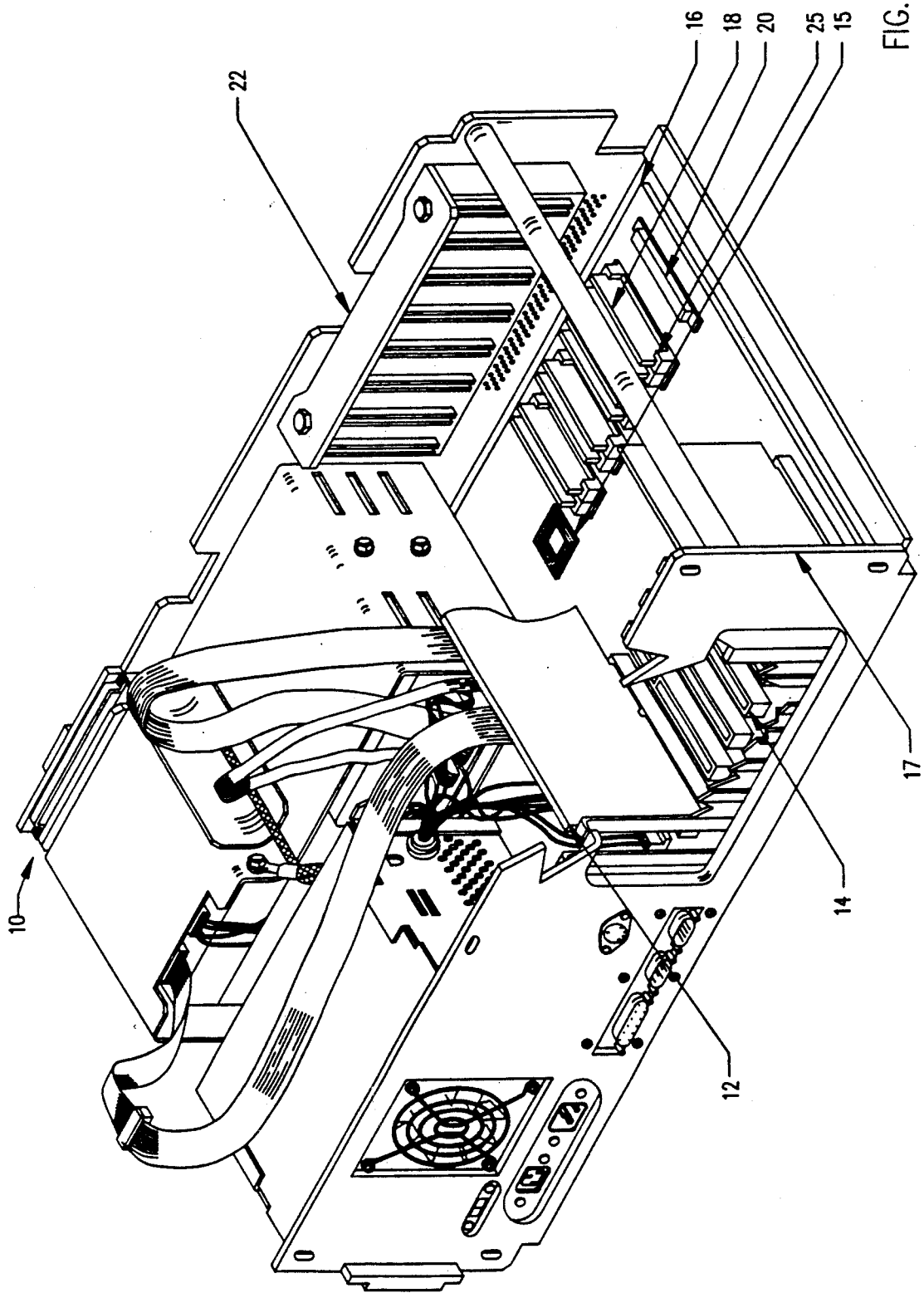
FIG. 1 is a partially cut-away perspective of the interior structure of the personal computer.

FIG. 1 illustrates inner section 10 of the personal computer of this invention. Card edge connectors 14 are shown in place on main logic board 16 which is mounted within chassis 17. The partially cut-away logic card 12 is shown in place within edge connector 14. SIMMs memories 18 are shown within SIMMs sockets 25. Special connector 20 is shown which receives memory expansion board 30 (see FIG. 3). FIG. 1 illustrates full-length logic cards (such as logic card 12) extending across chassis 17, held in position by expansion card retainer 22.

Figure 2:
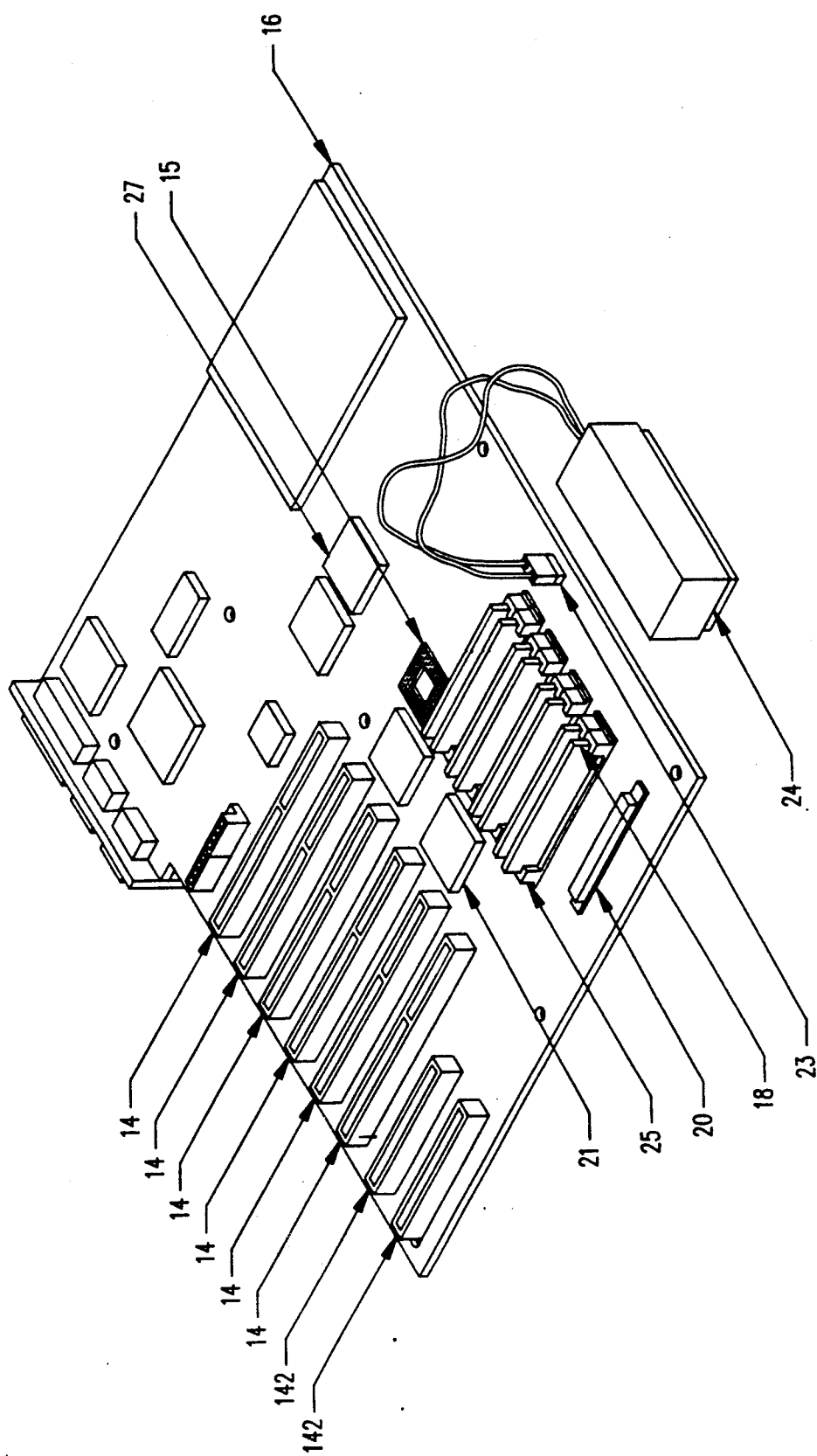
FIG. 2 is perspective drawing of the main circuit board with components in place.

FIG. 2 illustrates main logic board 16 having 8-bit expansion slots 14a and 16-bit expansion slots 14. SIMMs 18, forming the main high-speed memory, are shown in place in sockets 25 and battery 24 is shown connected with main logic board by battery connector 23.

Memory controller 27 is shown in place on main logic board 16. In this preferred embodiment, memory controller 27 is a Type 82C302 Page/Interleave Memory Controller of Chips and Technologies, Inc. CPU 27 is shown in place adjacent dualprocessor socket 15. CPU 27, in this preferrd embodiment, is an Intel 30386. Note that there are six (6) of the 16-bit expansion connectors 14 and two (2) of the 8-bit expansion connectors 14a for a total of eight (8) expansion slots. The dual-purpose expansion slot of this invention is located by special connector 20.

Figure 3:
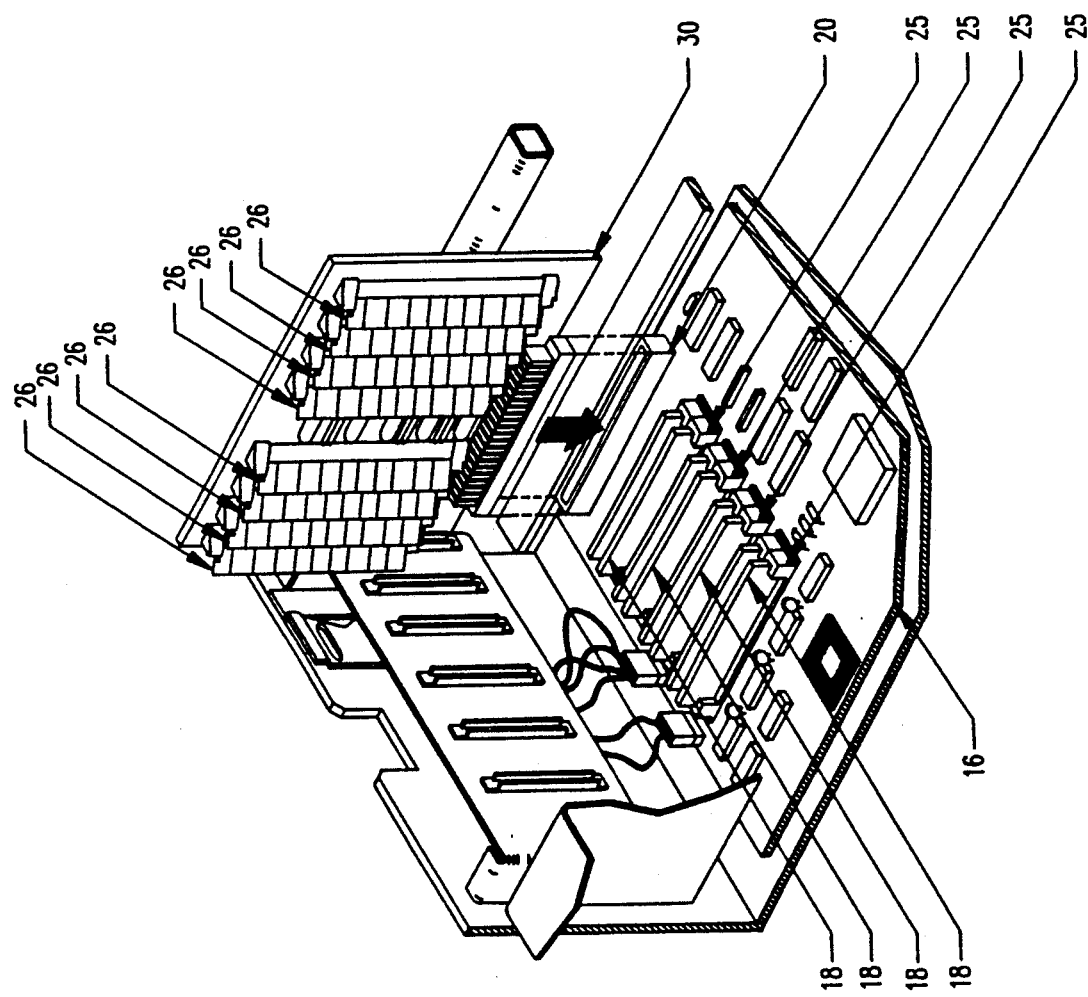
FIG. 3 is a perspective drawing of the expansion memory board removed from its socket.

FIG. 3 illustrates memory expansion board 30 removed from special connector 20. Memory expansion board 30 has eight (8) SIMMs 26 attached thereto. SIMMs sockets 25 are shown attached to main logic board 16.

Figure 4:
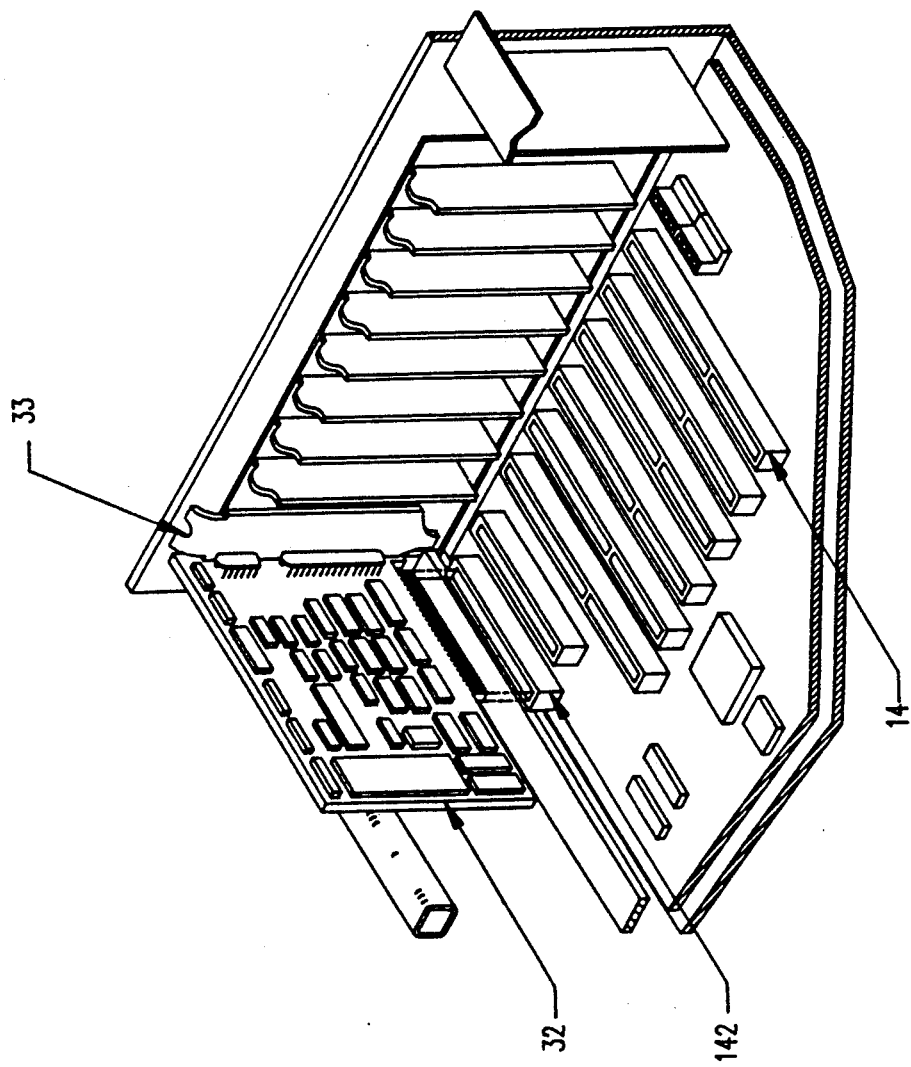
FIG. 4 is a perspective drawing of a short logic card removed from its socket.

FIG. 4 illustrates short logic card 32 (with components in place) removed from edge connector 14a. Bracket 33 (attached to card 32) is shown attached to chassis 17.

Figure 5:
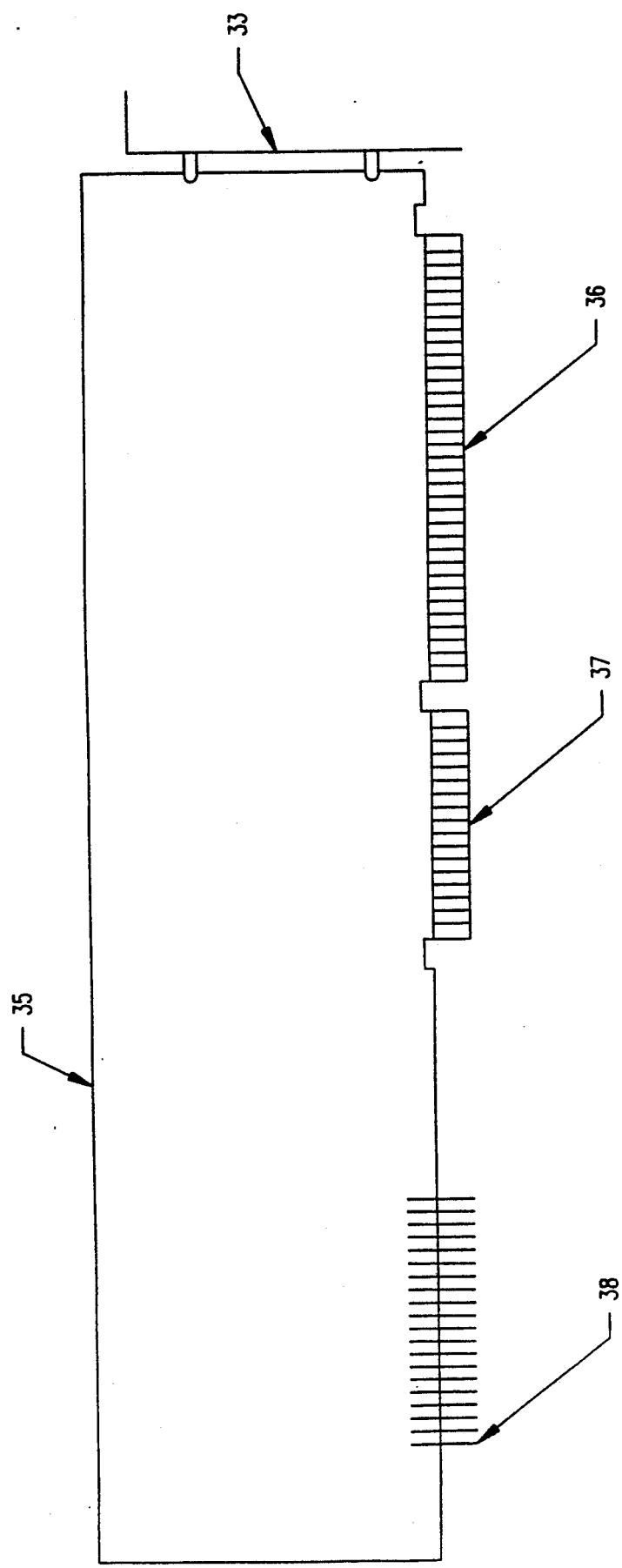
FIG. 5 is a front view of the logic/memory card of this invention.

FIG. 5 illustrates logic/memory card 35 showing edge connectors 36 and 37 ready for insertion into corresponding edge connectors 14. Pin connector 38 is inserted into special connector 20.

MODE OF OPERATION OF THE INVENTION

This invention is accomplished simply by inserting memory expansion board 30 (with SIMMs 26 in place) into special connector 20 which then enables the placement of short logic card 32 into edge connector socket 14a, thereby expanding the memory and returning the use of the I/O expansion slots 14a.

This invention may be practiced in other personal computers with more or less memory, more or less expansion slots with different implementations of memory and connectors, all without departing from the spirit and scope of this invention which is limited only by the appended claims.

The invention claimed is:

1. A personal computer system having an I/O channel and a memory channel, and having a dual purpose expansion slot, comprising:
    (a) a chassis;
    (b) a main logic board mounted on the chassis and incorporating the I/O channel and the memory channel;
    (c) a fixed number of expansion slots, including the dual purpose expansion slot, each occupying a fixed volume, positioned over the main logic board for providing space for selective connections of I/O devices, implemented on full length and short logic cards, to the I/O channel;
    (d) a high speed memory system mounted on the main logic board and connected to the memory channel, occupying a fixed amount of space; and
    (e) expansion high speed memory, mounted on the main logic board within the fixed amount of space, connected to the memory channel, and occupying a portion of the dual purpose expansion slot, the remaining portion being occupied by a short logic card, thereby enabling increased high speed memory capacity without eliminating I/O capability.

2. The system of claim 1 wherein any one or more of the selective connections of I/O devices, except the connection within the dual mode slot, comprises a full length logic card that occupies the associated expansion slot.

3. The system of claim 2 wherein any one or more of the selective connections of I/O devices comprises a short length logic card that occupies a portion of the associated expansion slot.

4. The system of claim 3 wherein the dual purpose expansion slot comprises the expansion high speed memory and a short logic card.

5. The system of claim 4 wherein the connections comprise card edge connectors.

6. The system of claim 5 wherein the fixed number of expansion slots is eight.

7. The system of claim 1 wherein the high speed memory system comprises a capacity of up to eight megabytes.

8. The system of claim 1 wherein the expansion memory comprises a capacity of up to eight megabytes.

9. The system of claim 1 wherein the high speed memory system comprises memory and memory control.

10. The system of claim 9 wherein the expansion memory comprises a printed circuit card, electrically connected to the memory channel, with memory mounted thereon and controlled by the memory control.

11. The system of claim 10 wherein the selective connection within the dual mode slot comprises a short logic card.

12. The system of claim 11 wherein the printed circuit card is integrated with the short logic card to form a logic/memory card that occupies the dual purpose expansion slot.

13. The system of claim 12 wherein the selective connection comprises a card edge connector.

14. The system of claim 12 wherein the fixed number of expansion slots is eight.

15. The system of claim 12 wherein the high speed memory system comprises a capacity of up to eight megabytes.

16. The system of claim 12 wherein the expansion memory comprises a capacity of up to eight megabytes.

17. A personal computer system having an I/O channel and a memory channel, comprising;
    (a) a chassis;
    (b) a main logic board mounted on the chassis and incorporating the I/O channel and the memory channel;
    (c) a plurality of expansion slots, each of a size large enough to contain a full length logic card, or a combination logic/memory card, positioned over the main logic board for providing selective connections of I/O devices, implemented on full length and short logic cards and on the logic/memory card, to the I/O channel;
    (d) a high speed memory system mounted on the main logic board and connected to the memory channel, occupying a fixed amount of space;
    (e) expansion high speed memory, mounted on the main logic board within the fixed amount of space, connected to the memory channel;
    (f) dual purpose expansion slot means included in the plurality of expansion slots, providing volume for the expansion high speed memory, or for a full length logic card connected to the I/O channel, or for the expansion high speed memory and a short logic card, or for a logic/memory card.

* * * * *